United States Patent [19]

Krause et al.

[11] Patent Number: 5,783,616
[45] Date of Patent: Jul. 21, 1998

[54] GRAFT COPOLYMERS OF UNSATURATED MONOMERS AND SUGARS, A PROCESS FOR THE PRODUCTION AND THE USE THEREOF

[75] Inventors: Frank Krause, Kleve; Helmut Klimmek, Krefeld, both of Germany

[73] Assignee: Chemische Fabrik Stockhausen GmbH, Krefeld, Germany

[21] Appl. No.: 833,007

[22] Filed: Apr. 4, 1997

Related U.S. Application Data

[62] Division of Ser. No. 713,538, Sep. 13, 1996, which is a division of Ser. No. 362,436, filed as PCT/EP93/01642 Jun. 26, 1993, Pat. No. 5,580,941.

[30] Foreign Application Priority Data

Jul. 2, 1992 [DE] Germany .................. 42 21 381.9

[51] Int. Cl.⁶ ............................................. C08K 5/07
[52] U.S. Cl. ........................ 524/58; 524/68; 510/461; 510/475; 510/476
[58] Field of Search .......................... 510/461, 475, 510/476; 524/58, 68

[56] References Cited

U.S. PATENT DOCUMENTS 5,227,446  7/1993  Denzinger et al. .............. 527/314
5,580,941  12/1996  Krause et al. .................. 527/300

*Primary Examiner*—Nathan M. Nutter
*Attorney, Agent, or Firm*—Evenson, McKeown, Edwards & Lenahan, P.L.L.C.

[57] ABSTRACT

The present invention relates to water-soluble, acid-groups-containing graft copolymers which are at least partially biodegradable and are based on sugars and monoethylenically unsaturated carboxylic acids, sulfonic acids and/or phosphonic acids or the salts of said acids as well as optional further monomers. The present invention further relates to a process for producing the graft copolymers at temperatures of up to 200° C. by means of radical polymerization initiators, in that a total mixture of 5–60%-wt. mono-, di- and oligosaccharides, the derivatives thereof or the mixtures thereof, and 95–40%-wt. of a monomer mixture comprising at least one monoethylenically unsaturated carboxylic acid, at least one monoethylenically unsaturated sulfonic acid, one monoethylenically unsaturated sulfuric acid ester and/or vinylphosphonic acid or the salts of said acids with monovalent cations, as well as optional further monomers is polymerized. The present invention further relates to the use of the graft copolymers in aqueous systems, for binding multivalent metal ions, inhibiting the water hardness, as additive in detergents and cleaning agents, as textile auxiliary, dispersing agent, in particular for pigments, and as auxiliary agent in the production of paper and leather.

2 Claims, No Drawings

GRAFT COPOLYMERS OF UNSATURATED MONOMERS AND SUGARS, A PROCESS FOR THE PRODUCTION AND THE USE THEREOF

This application is a division of application Ser. No. 08/713,538, filed Sep. 13, 1996, which in turn is a division of Ser. No. 08/362,436, filed as PCT/EP93/01642 Jun. 26, 1993, now U.S. Pat. No. 5,580,941.

The present invention relates to water-soluble, acid-groups-containing graft copolymers which are at least partially biodegradable and are based on sugars and monoethylenically unsaturated carboxylic and sulfonic acids as well as optional further monomers. The present invention further relates to a process for the production thereof and to their use in aqueous systems. This includes, e.g., inhibiting the negative effects of the water hardness, the dispersive action on pigments, the use in washing liquors and dye baths, as well as the use as auxiliary agents in the manufacture of paper and leather.

In these applications of the water-soluble polymers it is important that multivalent metal ions are complexed, hardness elements of the-water are prevented from precipitating or that pigments are dispersed in a high concentration at a low viscosity.

To increase the ecological acceptance of water-soluble polymers, there have been many attempts to manufacture biodegradable products. In general, the polymers technically used in the above-mentioned applications have a low degradability or cannot be degraded at all; in waste water treatment-plants a large amount thereof is fixed to the sludge by adsorption and thus eliminated from the aqueous system (cf. H. J. Opgenorth in Tenside Surfactants Detergents 24 (1987) 366–369, "Umweltverträglichkeit von Polycarboxylaten").

Polysaccharides are perfect polymers with respect to their biodegradability but their application technological properties are insufficient. For this reason, efforts have been made to improve the properties of the polysaccharides by modification; EP 0 427 349 A2, for example, describes the incorporation of carboxyl groups by oxidation.

The calcium-binding capacity of the so modified polysaccharide is improved, however, it fails to come up to the level of synthetic polycarboxylates. On the one hand, the polysaccharide gains calcium binding capacity, on the other hand, it loses part of its original biodegradability. The graft copolymerization of carbohydrates and unsaturated carboxyl-groups-containing monomers provides an alternative to the synthesis of at least partially degradable water-soluble polymers. Copolymers of unsaturated carboxylic acids with monosaccharides capable of forming enolates in alkaline solutions are known from DE 37 14 732 C2; they are partially biodegradable and their CaCO3-binding ability is said to be within the scope of commercical polyacrylates. Glucose, fructose, mannose, maltose, xylose and galactose are primarily mentioned as useful monosaccharides capable of forming enolates. The production technique is expensive and complicated since the final product of this manufacturing process is the sediment resulting from the acid precipitation but not the original polymer solution. Comparative Example 1 of the present document reveals that the precipitated polymer does not come up in an easily separable solid form but as a slimy, difficultly isolable sediment.

DE 38 34 237 A1 describes the use of sugars which can be produced synthetically from saccharose and fructose —the palatinose and/or leucrose—according to the polymerization procedure of DE 37 14 732 C2. According to the process of the above-mentioned patents or publications of patent applications the use of the low-priced disaccharide—saccharose—, which is technically available in large amounts, is explicitly excluded.

Radically initiated graft copolymers of mono-, oligo- or polysaccharides with a combination of unsaturated mono- and dicarboxylic acids used as detergent additives are known from DE 40 03 172 A1; they are said to be at least partially biodegradable. In addition, the graft polymers are attributed to have a comparable or even superior incrustation-inhibiting action in textile detergents, as compared to that of the known saccharide-free polymers of unsaturated mono- and dicarboxylic acids, e.g., described in EP 0 025 551 B1. In addition to their difficult polymerizability, which is sufficiently known to those skilled in the art, the dicarboxylic acids specified as formulation component in DE 40 03 172 A1 have a further disadvantage; it becomes apparent in a partial loss of carboxyl groups caused by the escape of carbon dioxide during polymerization. Said carbon dioxide separation is described in literature, for example, by BRAUM in Makromol. Chemie 96 (1966) 100–122 and TATE in Makromol. Chemie 109 (1967) 176–193; it means that the process involves an economic loss. In addition, the polyelectrolyte is less effective due to the partial loss of the carboxyl groups. Furthermore, DE 40 03 172 A1 states that the use of polysaccharides involves a time-consuming acid hydrolysis prior to polymerization in order to render them sufficiently soluble and that the polymers according to said invention frequently turn Up in cloudy condition, but previous experience has shown that, after longer storage periods, the medium settles down resulting in an inhomogeneous product.

The publication of Japanese patent application No. JP-A-61-31497 describes the use of a graft polymer as biodegradable detergent component. Said graft polymers are composed of polysaccharides of the starch, dextrin or cellulose type and water-soluble monomers; water-soluble monomers having carboxyl groups being preferred with particular preference for (meth)acrylic, itaconic, maleic or fumaric acid. Graft polymers of dextrin and acrylic acid are described in the application examples, the dextrin contents amounting to 67 to 34%-wt. The biodegradability was tested according to the MITI-guidelines; it was in the range between 42 and 10%, i.e., below the content of the natural material in the graft polymer. No indications are given with respect to the calcium-binding ability and the resistance to hard water. Although the quantity of graft polymer amounted to 20%-wt., i.e., was very high, the cleaning efficiency of a detergent containing one of said graft polymers only came up to the level of a comparative detergent which contained zeolite in an amount corresponding to that of the graft polymer.

EP 0 465 287 A1 describes a detergent composition which, among others, comprises a graft polymer as builder; this is composed of synthetic polydextrose and an unsaturated water-soluble monomer. Express preference is given to the monomers (meth)acrylic acid alone or combined with maleic or itaconic acid. The examples merely mention graft polymers of polydextrose and acrylic acid; in a washing test carried out in comparison to zeolite the incrustation reduction amounted to 46%. This is far worse than the results obtained in washing tests with the graft polymers according to DE 40 03 172 A1 where incrustation inhibitions of up to 57% had been achieved. Consequently, the graft polymers according to EP 0 465 287 A1 and JP-A-61-31497-have an inferior detergent effect to those according to DE 40 03 172 A1. There is no comparable data to make a judgement with respect to the calcium-binding capacity or the inhibition of hard water elements of the described graft polymers. However, since both properties are also important in laundering tests, one may assume that the polymers according to DE 40 03 172 A1 are superior to this regard, too.

It is the object of the present invention to produce clear, water-soluble, saccharide-containing graft copolymers by means of a simple technical process under avoidance of decarboxylating monomers, whereby said graft copolymers have an improved biodegradability and, as compared to the state of the art, an increased efficiency with respect to the property of completing multivalent metal ions; in addition they are good inhibitors for water hardness and have dispersive properties for substances in aqueous systems.

According to the present invention this object is achieved by a copolymer of sugar and a monomer mixture having the following composition:

A) 45–96%-wt. monoethylenically unsaturated C3–C10-monocarboxylic acid or mixtures of C3–C10 monocarboxylic acids and/or the salts thereof with monovalent cations, B) 4–55%-wt. monoethylenically unsaturated monomers comprising monosulfonic acid groups, monoethylenically unsaturated sulfuric acid esters, vinyl phosphonic acid and/or the salts of these acids with monovalent cations, C) 0–30%-wt. water-soluble, monoethylenically unsaturated compounds modified with 2–50 moles of alkylene oxide per mole, D) 0–45%-wt. other water-soluble, radically polymerizable monomers, E) 0–30%-wt. other radically polymerizable monomers which are slightly soluble or insoluble in water, with the sum of polymerization components A to E always amounting to 100%-wt., F) the sugar proportion of the graft copolymer amounting to 5–60%-wt., relative to the total mixture (sum of A to F).

Sugars according to the present invention the monomeric, dimeric and oligomeric compounds of sugar units, for example, the naturally occuring compounds saccharose, glucose and fructose and the mixtures thereof, as well as the acidic and enzymatic saccharification products of the polysaccharides, the mixtures of mono-, di- and oligosaccharides. Saccharose, glucose, fructose and the products resulting from the saccharification of starch are primarily preferred because of their availability and reasonable price. In addition, reaction products obtained from saccharides, such as sorbitol, mannitol, gluconic acid and glucuronic acid as well as alkyl glycosides, alkyl-, hydroxyalkyl- or carboxyalkyl ethers and other derivatives of the mentioned mono-, di- or oligosaccharides or mixtures of these substances may be used as sugar. The oligosaccharides have an average degree of polymerization of 1.1 to 20, preferably of 1.1 to 6. Suitable monoethylenically unsaturated C3 to C10 monocarboxylic acids mentioned under A) are acrylic acid, vinylacetic acid, 3-vinylpropionic acid, methacrylic acid, crotonic acid, dimethacrylic acid, 2-pentenoic acid, 3-hexenoic acid, and 2-hexenonic acid, the alkali or ammonium or amine salts thereof, as well as corresponding mixtures. Methacrylic acid, acrylic acid, vinylacetic acid are preferred, acrylic acid and methacrylic acid being particularly preferred.

Among the sulfonic-acid-comprising monomers and the monoethylenically unsaturated sulfuric esters mentioned in group B) the following ones are particularly preferred: vinyl-, allyl- and methallyl sulfonic acid and acrylaminomethylpropane sulfonic acid, styrene sulfonic acid as well as sulfuric acid esters of hydroxyethyl(meth)acrylate or of olefinically unsaturated alcohols, e.g., allyl- and methallyl sulfate and/or the salts thereof (in accordance with the definition given under A)).

The monomers mentioned under C) are: polyglycol ethers and/or esters of (meth)acrylic acid and (meth)allyl alcohol, which may optionally be capped at one end, examples thereof include an allyl alcohol etherified with 10 moles of ethylene oxide and a methoxypoly(ethylene glycol) methacrylate with 20 ethylene oxide units.

Because of their functionality the monomers mentioned under D) have a molecular-weight-increasing property; this is achieved by a higher degree of polymerization or by branching and cross-linking. For this reason, suitable monomers are those being readily polymerizable as well as those having two or more ethylenic double bonds acting as bifunctional cross-linking agents, or monomers having an ethylenically unsaturated double bond and another functional group. Examples thereof include: acrylamide, allyl methacrylate and glycidyl methacrylate.

Examples of monomers according to E) include: alkyl- and/or hydroxyalkyl(meth)acrylic ester, mono- and dialkylester of maleic acid, as well as N-alkyl- and N,N-dialkyl-(meth)acrylamide and vinylformic acid ester, e.g., methyl-, ethyl- and butyl(meth)acrylates, the corresponding hydroxyethyl-, -propyl-, -butyl-(meth)acrylates, N-methyl-, N-dimethyl-, N-tert.-butyl- and N-octadecylacrylamide, maleic acid mono- and diethylesters as well as vinyl acetate and vinyl propionate, provided that the copolymers produced are water-soluble.

The sugars and monomers mentioned above are illustrative only and shall not be understood as limitative.

The polymers according to the present invention may be obtained in solution or suspension according to polymerization methods known per se. Preferably, the polymerization of the monomers is carried out in aqueous solution. The polymerization is initiated by means of polymerization initiators dissociating into radicals. Redox systems and thermally decomposing radical formers or combinations thereof may be used, including catalyst systems which can be initiated by irradiation.

Above all, peroxides are suitable initiators, hydrogen peroxide and its combination with salts of peroxide sulfuric acid being preferred. The initiators are combined with reductants known per se, e.g., sodium sulfite, hydrazine, heavy metal salts, and others. Depending on the polymerization performance, the initiator system may be added continuously or in portions or with changing pH-values. The molecular weights may be influenced in known manner by means of regulators, such as mercapto compounds.

The graft copolymerization may be carried out such that part of the monomer mixture is prepared, the polymerization started and the monomer mixture added then. The sugar component is either added completely to the pre-mixed material or dosed together with the monomer mixture, or one part thereof is prepared and the other part dosed. The temperature during copolymerization may vary within wide ranges. This range is between 0° C. and 200° C. Depending on the initiators employed, optimum temperatures may be between 10° C. and 150° C., preferably between 20° C. and 120° C. It is possible to carry out the polymerization at the boiling point of the solvent at reduced or increased pressure.

It can frequently be advantageous to carry out the polymerization under adiabatic conditions. In this case the polymerization is suitably started at low temperatures, e.g. at 25°

C. The final temperature reached by the liberating polymerization heat depends on the monomers used and the concentration ratios, and in the case of an adequate pressure it may, for example, amount to up to 180° C.

During the copolymerization the pH-value may vary within wide ranges. Advantageously, the copolymerization is conducted at low pH-values, for instance such that the acrylic acid used is not or only partially pre-neutralized and that adjustment to neutral (pH 7-8) is effected only at the end of the polymerization, if necessary. The graft copolymers according to the present invention may be manufactured in a continuous or discontinuous procedure.

Production and properties of the graft copolymers according to the present invention are explained in the Examples. Most surprisingly, the binding capacity for multivalent cations, as compared to graft copolymers manufactured by using maleic anhydride, is considerably high. In addition, the precipitation of insoluble calcium and magnesium salts is considerably retarded when the products according to the present invention are used. The dispersing action of the graft copolymers according to the present invention on pigments is described by using talcum-slurries, the biodegradability is shown according to the modified MITI-test and the modified "Sturm-test" (OECD-guideline No. 301).

The graft copolymers may be used as dispersing and complexing agents; they bind multivalent metal ions in water-soluble complexes. They serve to inhibit water hardness. They are auxiliary agent and component in detergents, cleaning agents and washing and dye liquors, being excellently suitable as co-builders.

The graft copolymers according to the present invention exhibit a good biodegradability, they are extremely suitable for the use in textile detergents, dish washing agents, limestone and boiler scale removing agents, water treatment agents and textile auxiliaries. The graft copolymers may be used in aqueous solution, as a powder or granulate.

The following Table indicates the usual amounts (percentage by weight) of graft copolymers used in detergents and cleaners.

| | |
|---|---|
| Washing-powder (textiles) | 3 to 30% |
| Water softener | 5 to 30% |
| Cleaning agents (e.g. household cleaners) | 1 to 5% |
| Dish washing agents (machine) | 5 to 25% |

By way of example the following — merely illustrative but not limitative — formulations for detergents and cleaning agents can be given:

Washing-powder

| | |
|---|---|
| alkyl benzene sulfonate, Na-salt | 8% |
| fatty alcohol ethoxylate | 5% |
| soap | 3% |
| zeolite A | 25% |
| sodium carbonate | 15% |
| sodium metasilicate | 5% |
| magnesium silicate | 1% |
| sodium perborate | 20% |
| graft copolymers | 5% |
| sodium sulfate, water, others | ad 100% |

Dish washing agents (maschine)

| | |
|---|---|
| surfactant, low-foaming | 2% |
| sodium metasilicate | 50% |
| sodium carbonate | 5% |
| graft copolymers | 5% |
| sodium sulfate | ad 100% |

Clear rinse

| | |
|---|---|
| surfactant, low-foaming | 10% |
| graft copolymers | 5% |

-continued

| | |
|---|---|
| isopropanol | 10% |
| cumene sulfonate | 2% |
| water | ad 100% |

Dish washing agents (manual)

| | |
|---|---|
| paraffin sulfonate, Na-salt | 20% |
| fatty alcohol ether sulfate, Na-salt | 5% |
| betaine | 3% |
| graft copolymers | 2% |
| water | ad 100% |

All-purpose cleaners

| | |
|---|---|
| paraffin sulfonate, Na-salt | 5% |
| fatty alcohol ethoxylate | 5% |
| isopropanol | 5% |
| graft copolymers | 1-3% |
| water | ad 100% |

The polymers according to the present invention can advantageously be used as auxiliary agents in the finishing of textiles or textile materials. For example, in the boiling off or kier scouring of cotton, where they bind the hardening substances and disperse the accompanying substances of cotton or impurities, respectively; redeposition thereof is prevented and the action of surfactants supported. The polymers according to the present invention are used as stabilizers in hydrogen peroxide bleaching and, if stabilizing silicates are used additionally, they prevent silicate depositions.

The polymers according to the present invention may also be used as auxiliary agent in continuous and discontinuous washing and dyeing liquors, whereby the unfixed dye is removed and good fastnesses to washing, water and crocking or rubbing are achieved. In the case of polyester fibers, the dispersive action of the polymers has the effect that dissolving oligomeric polyester components disturbing the dyeing process are separated.

In the case of cellulose dyeing, the polymers according to the present invention promote the solubility of reactive and direct dyestuffs and result in an improved levelness of the dyestuff on the fibers, in particular where large amounts of salts are present in the liquor.

In vat dyeing they can advantageously be used as dyestuff pasting agent or as dispersant in the pigmentation bath. In the case of sulfur dyeing, they support the dyestuff dispersion and prevent bronzing.

In synthetic-fibers dyeing the formation of agglomerates from disperse dyestuffs is prevented by the polymers according to the present invention thus avoiding deposits in the cones.

In the washing off vat dyes and prints unfixed dyestuff components are bound by the polymers according to the present invention and redeposition is reduced to a considerable extent. Due to the increased dyestuff diffusion to the washing liquor, the polymers achieve an optimum removal of unfixed dyes with a saving in water and energy.

For this reason, the products according to the present invention represent an effective substitute for polyphosphates in the aftertreatment of naphthol dyeings; when reactive prints washed off, calcium alginate is prevented from precipitating.

The dispersing and complexing action of the polymers according to the present invention takes effect without remobilising heavy metal compounds, both from dyestuff chromophores (reactive and metal complex dyes) and from water-insoluble, naturally or industrially resulting deposits.

The quantities required in practice can be reduced by an amount three to five times less than that necessary when using conventional auxiliary agents, such as polyacrylates.

The polymers according to the present invention may be used in combination with surfactants, in particular anionic surfactants, in unneutralized form (as acid adjustment) in combination with complexing organic acids, such as citric acid, lactic acid, gluconic acid and phosphonic acids and surfactants, in particular anionic surfactants.

Such combinations are advantageously used, for instance, as a substitute for the conventional multistage pretreatment which is effected in separate baths, for example, to treat highly-loaded cotton or linters with the steps of acid extraction, chlorite bleach, boiling and $H_2O_2$-bleach; this is effected in such a manner that the pretreatment is carried out in only one adjustable treatment bath with the addition of the polymers according to the present invention.

This method according to the present invention can also be applied to continuous processes. Said methods prevent the formation of undesired organic halogen compounds and corresponding environmental impacts.

The polymers are suitable additives to desize fiber sizes which are sensitive to hardness of water, e.g. polyester sizes.

In the leather manufacture the polymers according to the present invention effect an increased chromium uptake through the leather during the chrome tanning and in retanning contribute to properties with respect to fullness and softness of the leather.

Because of their dispersing and heavy-metal-complexing but not remobilizing properties the polymers according to the present invention can advantageously also be used as auxiliary agent in papermaking, for instance, in the production of dispersions of pigments and fillers, such as kaolin, calcium carbonate, satin white, talcum, titanium dioxide, aluminum hydroxide and barium sulfate, as well as in the production of coating colors, whereby filler and pigment slurries as well as coating colors having a high solids content and a high storage stability are obtained.

The polymers according to the present invention may be used in combination with other auxiliary agents.

The products have a high ecological acceptance because the polymers according to the present invention have a high efficiency, which results in low concentrations to be used, and because of their good biodegradability.

The polymerization reactions illustrated in the following examples and comparative examples were conducted in a 2-liter-reaction flask equipped with stirrer, reflux condenser, thermometer and dosing mechanism for liquid and gaseous substances.

EXAMPLES 1–7

A mixture of acrylic acid, sugar, sodium methallyl sulfonate, a further comonomer and water is partially neutralized with 50% sodium hydroxide solution in the reactor, cooled to 25° C. and 8.8 g mercaptoethanol, 0.02 g iron sulfate in 10.0 g water and 3 g 35% hydrogen peroxide are added thereto. When the temperature in the reactor rises above 75° C. due to the starting polymerization reaction, it is cooled down to 75° C. after the maximum temperature has been reached. If the temperature remains below 75° C., heating to 75° C. is carried out after reaching the temperature maximum. Subsequently, 2 g hydroxylammonium chloride in 15.7 g water and 14.3 g 35% hydrogen peroxide are placed into the reactor and a renewed temperature elevation awaited. After the exothermic reaction has decayed, it is heated to 95° C. and this temperature is kept for 2 hours followed by cooling and neutralization with 50% sodium hydroxide solution at 40° to 45° C. The polymers are brown and clear. The quantities used and the indications with respect to the polymers are given in Table 1.

EXAMPLE 8

The polymerization course corresponds to that of Examples 1 to 7, with the exception that the partial neutralization in the beginning is omitted and the polymerization is effected in acidic manner.

EXAMPLES 9 TO 11

The polymerization course corresponds to that of Examples 1 to 8, however, 4.4 g mercaptoethanol were used.

The results are given in Table 1.

TABLE 1

| Example | Acrylic Acid | Sugar component | Na-methallyl-sulfonate | Comonomer | Sodium hydroxide solution Start + End | Water | Viscosity (mPa · s) | Solids content % | pH-value |
|---|---|---|---|---|---|---|---|---|---|
| 1 | 140 | 108.9 saccharose | 72.6 | — | 36 + 114.7 | 474 | 20 | 39.1 | 8.4 |
| 2 | 112 | 145.2 saccharose | 72.6 | — | 28.8 + 81 | 506 | 31 | 38.3 | 5.9 |
| 3 | 212 | 150 saccharose | — | 150 AMPS$ | 54.6 + 173.9 | 206 | 1200 | 51.1 | 7.3 |
| 4 | 126 | 108.9 saccharose | 90.8 | — | 32.4 + 103.3 | 485 | 34 | 37.8 | 7.2 |
| 5 | 168 | 72.6 saccharose | 72.6 | — | 43.2 + 137.7 | 452 | 72 | 39.5 | 8.4 |
| 6 | 238 | 36.3 saccharose | 18.1 | — | 61.2 + 195 | 397 | 200 | 39.4 | 8.0 |
| 7 | 154 | 108.9 saccharose | 54.5 | — | 39.6 + 126.2 | 463 | 40 | 37.9 | 7.3 |
| 8 | 212 | 150 saccharose | 75 | — | — + 228.4 | 283 | 780 | 52.0 | 6.5 |
| 9 | 140 | 109 saccharose | 54.5 | 1.83 MPEG-1000-MA$$ | 30 + 114.7 | 441 | 56 | 37.7 | 6.6 |
| 10 | 140 | 109 saccharose | 36.3 | 36.3 AAEO-20$$$ | 36 + 114.7 | 478 | 68 | 37.4 | 6.6 |
| 11 | 140 | 109 saccharose | 36.3 | 36.3 AAEO-10$$$$ | 36 + 114.7 | 478 | 48 | 37.9 | 6.4 |

$ = 50% solution of the sodium salt of the acrylamidomethylpropane sulfonic acid
$$ = methyoxy(polyethylene glycol)methacrylate, molar mass 1068
$$$ = allyl alcohol ethoxylate with 20 moles of ethlene oxide
$$$$ = allyl alcohol ethoxylate with 10 moles of ethylene oxide

EXAMPLE 12

224 g acrylic acid are mixed in the polymerization reactor with 381.6 g water and partially neutralized with 64 g 45% sodium hydroxide solution. 36.3 g saccharose und 36.3 g sodium methallyl sulfonate are stirred into this solution.

Subsequently, 8.8 g mercaptoethanol, 0.02 g iron(II) sulfate in 10.0 g water and 3 g 35% hydrogen peroxide are added. The temperature increases from 25° C. to 101° C. and drops again. At 75° C., 2 g hydroxylammonium chloride in 15 g water and 14.3 g 35% hydrogen peroxide are added causing the temperature to increase to 79° C. The temperature is elevated to 95° C. by heating and maintained at that temperature for 2 h. Afterwards, 15 g 35% hydrogen peroxide is added, the temperature is decreased to 70° C., and neutralization is carried out with 204 g 45% sodium hydroxide solution and polymerization is allowed to continue for 30 minutes at 70° C. The finished polymer is bright-yellow and clear, has a dry substance contents of 41.1%, a viscosity of 80 mPa.s and a pH-value of 6.6. The number and weight average of the molecular weight are as follows: Mn=1412 and Mw =4939. The residual monomer content of acrylic acid amounts to 0.006% and that of sodium methallyl sulfonate 0.143%.

EXAMPLE 13

82.2 g acrylic acid are diluted with 414.8 g water and mixed with 21.1 g sodium hydroxide solution (50%), 58.1 g sodium methallyl sulfonate, 116.2 g saccharose and 205.4 g acrylamide solution (40% aqueous solution). After the addition of 8.8 g mercaptoethanol, 0.02 g iron(II) sulfate in 10 g water and 3 g 35% hydrogen peroxide the temperature rises from 25° C. to 70° C., whereupon 2 g hydroxylammonium chloride in 15 g water and 14.3 g 35% hydrogen peroxide are added. As a result, the temperature rises to 79° C. and is increased to 95° C. by means of a heating bath and kept for 2 hours. Subsequently, it is cooled to 45° C. and neutralized with 67.3 g 50% sodium hydroxide solution. The polymer is of a dark brown color and clear, the solids content amounts to 36.8%, the viscosity is of the order of 35 mPa.s and the pH-value amounts to 7.00.

EXAMPLE 14

192.8 g acrylic acid are mixed with 272.6 g water, 55.1 g 45% sodium hydroxide solution, 100 g sodium methallyl sulfonate and 150 g saccharose. At 25° C., 8.8 g mercaptoethanol, 0.02 g iron sulfate in 10 g water and 3 g 35% hydrogen peroxide are added. The temperature rises to 91° C. and drops again. Starting at 72° C., 2 g hydroxylammonium chloride in 15 g water and 14.3 g 35% hydrogen peroxide are added whereupon the temperature rises to 93° C. Once again 2 g hydroxylammonium chloride in 15 g water and 14.3 g 35% hydrogen peroxide are added, and a temperature of 95° C. is maintained for 2 hours. The polymer is clear and has a dark brown color, the pH-value amounts to 6.3, the viscosity amounts to about 530 mPa.s and the solids content to about 51.2%. The number and weight average of the molecular weight were found to be Mn=841 and Mw=2554. The residual monomer content of acrylic acid amounts to 0.002% and that of sodium methallyl sulfonate 0.77%.

EXAMPLE 15

30%-wt. of a mixture consisting of 212.1 g acrylic acid, 150 g saccharose, 75 g sodium methallyl sulfonate, 287.7 g water and 54.6 g 50% sodium hydroxide solution are placed in the reactor and 2.6 g mercaptoethanol, 0.9 g 35% hydrogen peroxide and 0.02 g iron (II) sulfate in 8.6 g water were added thereto at 21° C., whereupon the temperature increases to 86° C. 6.2 g mercaptoethanol and 0.02 9 iron(II) sulfate in 8.6 g water are added then, and the rest of the above-mentioned monomer mixture as well as a solution of 2.1 g 35% hydrogen peroxide in 1.4 g water are simultaneously dosed thereto within 1 hour. The temperature is kept at 85° C. After the end of dosing, 14.3 g 35% hydrogen peroxide is added. The temperature rises to 97° C. and drops again. 2 g hydroxylammonium chloride in 8.5 g water are added on reaching 85° C., and the temperature is maintained for 2 hours. Subsequently, it is cooled to 40° C. and neutralization is carried out with 173.8 g 50% sodium hydroxide solution. The polymer is dark brown and clear, the dry substance amounts to 52.8%, the pH-value to 6.7 and the viscosity to 1040 mpa.s. The number and weight average of the molecular weight were determined to be Mn=1755 and Mw=6773. The residual content of acrylic acid amounts to 0.01% and that of sodium methallyl sulfonate to 0.32%.

EXAMPLE 16

212.1 9 acrylic acid are mixed with 281.3 g water, 54.6 g 50% sodium hydroxide solution, 75 g sodium methallyl sulfonate and 150 g saccharose; at 25° C., 8.8 g mercaptoethanol, 0.02 g iron(II) sulfate in 10 g water and 3 g 35% hydrogen peroxide are added. The temperature rises to 101° C. and then drops again. Starting at 80° C., 2 g hydroxylammonium chloride in 8.6 g water and 5 g sodium persulfate in 15.0 g water are added, subsequently a temperature of 85° C. is maintained for 70 minutes. After cooling to 40° C., neutralization is effected using 173.8 g 50% sodium hydroxide solution. The polymer is clear and yellow, has a solids content of 51.5%, a viscosity of 360 mPa.s and a pH-value of 6.5.

EXAMPLE 17

212.1 g acrylic acid are mixed with 2.5 g triallyl amine, 281.3 g water, 54.6 g 50% sodium hydroxide solution, 75 g sodium methallyl sulfonate and 150 g saccharose, at a temperature of 20° C., 0.02 g iron(II) sulfate in 10 g water and 3 g 35% hydrogen peroxide are added thereto. Under gentle heating, the temperature increases to 102° C. within 90 minutes. Subsequently, it is allowed to cool down to 75° C., 2 g hydroxylammonium chloride in 15 g water and 14.3 g 35% hydrogen peroxide are added and stirring is effected for 1 hour at 95° C. Then it is cooled to 40° C. and it is neutralized with 174 g 50% sodium hydroxide solution. The polymer is clear and brown, has a dry substance contents of 52.3%, a viscosity of 1900 mpa.s and a pH-value of 7.6. The number and weight average of the molecular weight were determined: Mn=2558 and Mw=8467.

EXAMPLE 18

74.7 g acrylic acid, 26.4 g sodium methallyl sulfonate, 150 g saccharose, 186.6 g water and 43.4 g sodium hydroxide are jointly dissolved, placed in the reactor and heated to boiling. Within 5 hours, a solution of 137.4 g acrylic acid, 48.6 g sodium methallyl sulfonate and 50 g water is dosed thereto, and within a period of 6 hours 80 g 30% hydrogen peroxide and 96 g of a 25% aqueous sodium persulfate solution are added each. Subsequent stirring for 1 hour follows the dosage; cooling to 40° C. and neutralization with 166.9 g 50% sodium hydroxide solution. The polymer is transparent and clear, has a solids content of 52% and a viscosity of 820 mpa.s. The residual monomer content amounts to 0.002% of acrylic acid and 0.025% of sodium methallyl sulfonate. The number and weight average of the molecular weight amounted to Mn=2014 and Mw=5135.

EXAMPLE 19

190.8 g acrylic acid, 261.0 g water, 49.0 g 50% sodium hydroxide solution, 150 g saccharose, 75 g sodium methallyl sulfonate and 21.2 g vinyl acetate are jointly dissolved and placed in the reactor. After the addition of 8.8 g mercaptoethanol, 0.02 g iron(II) sulfate in 10 g water and 3 g 35% hydrogen peroxide, the temperature rises from 23° C. to 88° C. and drops again to 75° C., whereupon 2 g hydroxylammonium chloride in 15 g water and 14.3 g 35% hydrogen peroxide are added. For a short time, the temperature rises to 90° C. and is kept at approximately 86° C. for 1 hour by means of a heating bath. A water separator is mounted to distill off unreacted vinyl acetate. 5 g vinyl acetate and 31.7 g water are separated within 1 hour, the temperature in the reactor rising to 99° C. Subsequently, it is cooled and neutralized with 50% sodium hydroxide solution. The polymer is clear and has a dark brown color, the dry substance contents amounts to 51%.

COMPARATIVE EXAMPLE 1

(according to DE 37 14 732 C2, Example 2)

108 g acrylic acid is neutralized with 300 g 20% sodium hydroxide solution. 91 g glucose is dissolved in 100 g water and mixed with 49 g 35% H2O2-solution. 100 g water is heated to 85° C. in the reaction vessel, and the acrylic acid and glucose solution is run in within 90 minutes, the pH-value is kept at 9.0. 10 minutes after termination of the dosage, the temperature in the reaction vessel suddenly rises to 103° C. and the polymer discolors into yellow. Cooling is performed subsequently. The polymer solution has a solids content of 30.6% and a viscosity of 220 mPa.s. By adding hydrochloric acid, the polymer can be precipitated in the form of a slimy precipitate.

COMPARATIVE EXAMPLE 2

(according to DE 40 03 172 A1, Example 21)

243 g water, 160 g saccharose, 47.9 g maleic anhydride, 0.57 g phosphoric acid and 2 g sodium hydrogensulfite are placed in the reaction vessel and stirred for 1 hour at 80° C. in a nitrogen stream. Subsequently, 70.5 g 50% sodium hydroxide solution is slowly added thereto, and a solution of 133.6 g acrylic acid in 141.9 water is dosed within 5 hours at 80° C., and solutions of 8.1 g 35% hydrogen peroxide in 37.6 g water and 2.85 g sodium sulfate in 40 g water are evenly added within a period of 6 hours. Then the batch is subjected to a final heat treatment for 2 hours. The polymer solution exhibits a solids content of 37.7% and a viscosity of 155 mPa.s.

COMPARATIVE EXAMPLE 3

(according to DE 40 03 172 A1, Example 25)

290 g maltodextrin MD 14 (dextrose-equivalent-value 14, of Avebe), 470 g water, 4.2 ml 0.1% aqueous solution of iron(II) ammonium sulfate, 101.4 g maleic anhydride and 74.5 g sodium hydroxide are placed into the reaction vessel and heated to boiling. After the start of boil, a mixture of 120 g acrylic acid and 132.7 g of a 50% aqueous solution of the sodium salt of the acrylamidomethylpropane sulfonic acid is dosed within a period of 5 hours, and 80 g 30% hydrogen peroxide and a solution of 24 g sodium persulfate in 72 g water is dosed within 6 hours, keeping the temperature at the boil of the mixture. After the end of the last initiator dosage, a final heat treatment is carried out for 1 hour. Then neutralization is effected with 155 g 50% sodium hydroxide solution. A cloudy, brown solution is obtained which has a solids content of 45.2% and a viscosity of 560 mpa.s. Within a period of 14 days, a precipitate has deposited from the turbid solution.

COMPARATIVE EXAMPLE 4

108.9 g saccharose, 185 g water, 77 g maleic anhydride, 2.2 mg iron(II) ammonium sulfate and 112.8 g 50% sodium hydroxide solution are placed in the reactor and heated to the boil. After boiling started, a solution of 77 g acrylic acid, 54.4 g sodium methallyl sulfonate and 94 g water are added within 4 hours, and a solution of 34 g 35% hydrogen peroxide, 12 g sodium persulfate and 66 g water is added within 5 hours. Stirring at reflux for 1 hour, and subsequent neutralization with 93.6 g 50% sodium hydroxide solution. The brown polymer solution is clear, has a viscosity of 74 mPa.s and a solids content of 43.8%. Development of carbon dioxide could be observed during the whole polymerization reaction.

Comparative Example 4 was conducted according to DE 40 03 172 A1 using maleic anhydride as comonomer; it shows the resulting loss of carboxyl groups by CO2-separation and the drastic decrease in calcium binding capacity (Table 4) as compared to the polymer according to the present invention of Example 7. The monomer composition of comparative Example 4 differs from Example 7 only by the fact that 50% of the acrylic acid has been replaced by maleic anhydride.

COMPARATIVE EXAMPLE 5

154 g acrylic acid, 444 g water, 54.5 g sodium methallyl sulfonate, 113.7 g maltodextrin (dextrose-equivalent-value 20) and 39.6 9 50% sodium hydroxide solution are dissolved in the reactor and 4.4 g mercaptoethanol, 0.02 g iron sulfate in 8.6 g water and 3 g 35% hydrogen peroxide in 1.4 g water are added at 28° C. The temperature rises up to 62° C. 2 g hydroxylammonium chloride in 8.6 g water and 14.3 g 35% hydrogen peroxide in 7 g water are added then. The temperature rises again and reaches its maximum at 75° C. The temperature is increased to 95° C. by means of an external heating bath, and maintained for 2 hours. Subsequently, it is cooled down to 30° C., neutralized with 126.2 g 50% sodium hydroxide solution and adjusted with 13.7 g water to a solids content of 36.5%. The polymer is turbid, has a brown color and a viscosity of 90 mpa.s. The turbidity settles as sediment within a few days.

Comparative Example 5 was carried out following Example 7, however, the sugar component was exchanged for a starch derivative (maltodextrin). This shows that the use of higher molecular polysaccharides frequently results in cloudy and non-uniform polymers.

Determination of the resistance to hard water

A certain amount of a 10% solution of graft copolymer is added to a test water having 33.6° dH [=German water hardness] (pure calcium hardness), boiled on a heating plate for 5 minutes and subsequently judged with respect to clarity, opalescence and turbidity. By varying the amount of graft copolymer, the concentration of gram of product (solids content) per liter of hard water is determined, i.e., the concentration at which after previous turbidity/opalescence a clear solution results for the first time.

The results clearly demonstrate that the polymers according to the present invention can provide an effectively inhibition of boiler scale or similar deposits or precipitations of components of the hard water.

TABLE 2

| Product Example | Hard water resistance clear at (g solids/l) |
|---|---|
| 4 | 1.5 |
| 8 | 2.0 |
| 9 | 0.5 |
| 12 | 2.0 |
| 13 | >1.0 |
| 16 | 2.5 |
| Comp. Example 1 | >3.0 |
| Comp. Example 2 | 3.0 |

Dispersion tests

In order to demonstrate the dispersive action of the graft copolymers according to the present invention on pigments, talcum (Finntalc C10, of OMYA) was stirred into aqueous graft copolymer solutions of pH 12.0 up to a pigment content of 65%, the viscosity was measured immediately and after 7 days, the stirrability (1 to >6) was rated. The combination of POLYSALZ-S/LUMITEN-P-T (BASF AG) was used as state of the art. The addition of the dispersing agent amounted to 0.2%/abs. dry pigment, and in the use of case POLYSALZ-S/LUMITEN-P-T following manufacturer's recommendation, it amounted to 0.15/1% on abs. dry pigment.

TABLE 3

| storage period | Slurry Viscosity (mPa · s, Brookf., 100 rpm) | | | Stirrability 1: very good 6: very bad |
|---|---|---|---|---|
| | immediately | after 7 d. | after 14 d. | |
| dispersant | | | | |
| Example 1 | 262 | 261 | 280 | 3–4 |
| Example 3 | 290 | 455 | — | 3 |
| LUMITEN P-T + POLYSALZ S | 280 | 340 | 358 | 3 |

Determination of the calcium-binding-capability

The capability of binding calcium is determined according to the so-called Hampshire-test, wherein the polymer is tritrated with a calcium acetate solution in the presence of carbonate ions. The final value of titration is expressed in mg $CaCO_3$/g polymer.

Procedure: 1 g complexing agent is dissolved in 50 ml distilled water, neutralized with sodium hydroxide solution, and 10 ml 2% sodium carbonate solution is added thereto; 100 ml are filled up and the pH-value is adjusted to 11.0. Titration is carried out with 0.25 ml calcium acetate solution until a sustained and distinct turbidity/precipitation occurs. The stage prior to turbidity is recognized by a slight opalescence, the transition is either narrow or broad depending on the complexing agent. The complexing power of some of the polymers according to the present invention is as high that apart from an opalescence no turbidity occurs.

TABLE 4

| Product Example No. | Calcium-binding-capacity acc. to Hampshire (mg $CaCO_3$/g polymer) |
|---|---|
| 1 | 1898 |
| 2 | 990 |
| 3 | slightly opal, no turbidity/precipitate |
| 4 | 2104 |
| 5 | 2148 |
| 7 | 1642 |
| 8 | 2061 |
| 9 | slightly opal, no turbidity/precipitate |
| 10 | 1931 |
| 11 | 2972 |
| 12 | 1169 |
| 13 | >3000 |
| 14 | 2216 |
| 15 | 1450 |
| 16 | 1490 |
| 18 | 2172 |
| Comp. Ex. 1 | 299 |
| Comp. Ex. 2 | 697 |
| Comp. Ex. 4 | 497 |

The polymers according to the present invention exhibit very high values for the calcium binding power. If maleic anhydride (Comparative Examples 2 and 4) is additionally used, or in the absence of sulfonic-acid-groups-containing monomers (Comparative Example 1), polymers with a diminished calcium binding capacity are obtained.

Biodegradability

The biodegradability may be determined by several methods. The so-called ZahnWellens-test, for example, examines the carbon reduction in a test medium containing sewage sludge. Since the carbon decrease may either occur by biological decomposition or by adsorption at the sludge, a clear interpretation of the results is not possible.

For this reason, a modified MITI-test (OECD Guideline 301 for Testing Chemicals) has been used to judge the biodegradability; in this test the oxygen demand during the degradation is measured. Assessment errors due to adsorption problems in the sludge do not occur. In the above-mentioned MITI-test, the graft polymer of Example 7 showed a biological degradation of 78.5% B.O.D./C.O.D. after 28 days. This result represents a good biodegradability.

TABLE 5

| Period (days) | Biodegradability (% B.O.D/C.O.D) |
|---|---|
| 0 | 0 |
| 7 | 0 |
| 14 | 46.5 |
| 21 | 61.0 |
| 28 | 78.5 |

The STURM-test according to the EC guideline 84/449/EWG C5 and the OECD Guideline No. 301 B was used as additional degradation test. The biological degradation of the polymer according to Example 20 was observed by the carbon dioxide development within 28 days and determined by 89%.

| Period (days) | Biodegradability (% B.O.D./C.O.D.) |
|---|---|
| 30 min | 1 |
| 3 | 18 |
| 7 | 34 |

-continued

| Period (days) | Biodegradability (% B.O.D./C.O.D.) |
|---|---|
| 12 | 51 |
| 18 | 76 |
| 21 | 77 |
| 26 | 91 |
| 28 | 89 |

EXAMPLE 20

Example 9 is repeated except for the fact that 36.3 g methoxypolyethylene glycol methacrylate and 36.3 g sodium methallyl sulfonate are used. The polymer has a solids content of 36.3%, a pH-value of 6.3 and a viscosity of 80 mPa.s. The average number and weight with respect to the molecular weight were determined: Mn=2009 and Mw=7170.

EXAMPLE 21

8.83 g mercaptoethanol, 0.02 g iron sulfate (dissolved in 10 g water) and 3 g 35% hydrogen peroxide solution (dissolved in 5 g water) are added to a solution of 154 g acrylic acid, 39.6 g 50% sodium hydroxide solution, 108.9 g sodium sulfatoethyl methacrylate (50% aqueous solution), 136.1 g glucose in 372 g water at 25° C. Within 9 minutes, the temperature rises to 80° C., whereupon 2 g hydroxylamine hydrochloride (dissolved in 10 g water) and 14.3 g 35% hydrogen peroxide (dissolved in 10 g water) are added. Subsequently, it is heated to 95° C. and this temperature-maintained for 2 hours. After cooling, neutralization is effected with 126.2 g 50% sodium hydroxide solution. The polymer exhibits a solids content of 36.1%, a pH-value of 5.5 and the following average values of the molecular weight: Mn=1684 and Mw=6800.

EXAMPLE 22

Example 3 is repeated with the exception that instead of AMPS an equivalent weight amount of vinylphosphonic acid is used. During the initial phase, the polymerization course is somewhat retarded and clearly becomes exothermic again after gentle heating for a short period. The polymer has a dry substance of 52.0% and a viscosity of 960 mPa.s; the pH-value amounts to 5.4.

EXAMPLE 23

According to the experimental course of Examples 1–7, a polymer having the following monomer components is manufactured:

| Pre-mixture | 61.6 g acrylic acid, 43.6 g hydroxyethyl glycoside, 21.8 g Na-methallyl sulfonate, 170.5 g water and 15.8 g 50% sodium hydroxide solution. |
|---|---|
| Initiation | 3.5 g mercaptoethanol, 8 mg iron(II) sulfate dissolved in 8 g water, 1.2 g hydrogen peroxide (35%) and 0.8 g hydroxylamine hydrochloride dissolved in 8 g water and 5.7 g hydrogen peroxide (35%) dissolved in 7 g water. |

Neutralization: 50.5 g sodium hydroxide solution (50%).

The polymer has a solids content of 34.9%, a pH-value of 7.0 and a viscosity of 37.5 mpa.s. The calcium-binding-capacity according to Hamphire amounts to 1369 mg $CaCO_3$/g polymer solids.

EXAMPLE 24

Example 3 was conducted again but instead of the AMPS monomer 187.5 g of a 40% solution of the Na-salt of allyl iminodiacetic acid was used.

The polymer had a solids content of 53.0% and a viscosity of 1210 mPa.s. The hard water resistance amounts to 2.0 g polymer solids/l.

EXAMPLE 25

192.8 g acrylic acid is diluted with 276.7 g water and mixed with 49.6 g sodium hydroxide solution (50%), 150.0 g saccharose, 75 g Na-methyallyl sulfonate and 25 g methoxypolyethylene glycol methacrylate (17 moles EO). After the addition of 20 mg iron(II) sulfate dissolved in 10 g water and 4.4 g mercaptoethanol, the polymerization is started with 3.0 g 35% hydrogen peroxide dissolved in 10 g water. After reaching the temperature maximum of 87° C., a solution of 4.5 g sodium persulfate in 40 g water is added followed by subsequent stirring at 95° C. for 2 hours. After cooling, neutralization with 158.0 g 50% sodium hydroxide solution is carried out. The polymer has a solids content of 50.0%, a molecular weight of Mw=6×$10^3$ and Mn=1.8×$10^3$ and a hard water resistance of 1.5 g polymer solids/l.

According to Example 25 a polymer was produced in which the amounts of sodium methallyl sulfonate and methoxypolyethylene glycol (17 mole EO) amounted to 50 g each. The product had a solids content of 50% and did not show any deposits in the turbidimetric titration carried out to determine the calcium-binding-capacity. The resistance to hard water was of the order of 1.5 g polymer solids/l.

EXAMPLE 26

Washing of dyed material

The use of the polymers according to the present invention is decribed with reference to a discontinuous washing of a cotton fabric which had been subjected to reactive dyeing.

At first, the dyeing liquor is drained off followed by 1. rinsing with overflow at 60° C. for 10 min.
2. rinsing in fresh bath at 90° C. for 10 min.
3. allowing to stand with 1 g/l polymer acc. to Example 9 at 90°–95° C. for 10 min. rinsing at 45° C. for 15 min.

The cotton fabric has an intensive color, shows no bleeding and exhibits good washfastness.

The above-mentioned periods of time, temperatures and sequences are intended to be illustrative. The polymers according to the present invention can also be used under other washing conditions.

EXAMPLE 27

Behavior of the dispersing agents in highly alkaline liquor

Test solutions (500 ml liquor) of water of 25° dH, 10 g/l NaOH and the polymer according to the present invention are heated to boiling temperature, maintained at this temperature for 15 minutes and cooled. The liquor loss is compensated by the additon of water (20° dH).

Table 6 indicates the appearance of the solutions in dependence on the amount used and in comparison with commercial products I, II and III:

TABLE 6

| Product | Amount used | | | |
|---|---|---|---|---|
| | 0.5 g/l | 1 g/l | 2 g/l | 3 g/l |
| product I | flocculate | flocculate | flocculate | clear |
| product II | flocculate | flocculate | opal-clear | clear |
| product III | opal-cloudy | clear | clear | clear |
| polymer acc. to Ex. 25 | opal-cloudy | clear | opal-clear | clear |

Clear solutions are obtained, if quantities starting from:
3 g/l with I
2 g/l with II
1 g/l with III
1 g/l polymer according to Example 25 are used.

EXAMPLE 28

Raw cotton ropes are boiled off with 5 ml acetic acid at a liquor ratio of 1:10 for 30 minutes. Subsequently, 200 ml of the liquor is cooled to 60° C. and each of the following is added:

0.5 g/l, 1.0 g/l and 2 g/l of polymer according to Example 25
0.05 g/l indanthrene blue BC Coll
20.0 ml/l NaOH, 50% and
5.0 g/l hydrosulfite, conc.

After a residence time of 15 minutes (at 60° C.), the liquor was respectively sucked off by a "Blauband-Filter" [blueband-filter].

The polymers show a good dispersive action; in the concentrations used thy prevent precipitation of flocculates.

EXAMPLE 29

At a liquor ratio of 1:20 and at a temperature of 70° to 80° C. black-dyed PES-flake was treated with a liquor of 1 g/l polymer according to Example 25 and 1 g/l SOLOPOL DP (fatty amine ethoxylate, trade name of Chemische Fabrik Stockhausen GmbH, Krefeld) for 20 minutes; it was then subjected to hot and cold rinsing.

Oligomers, color and fiber dust was removed from the fibers.

EXAMPLE 30

5 g of the polymer according to Example 16 is dissolved with distilled water in a 500 ml-measuring flask, and the flask was filled up to the mark. 10 ml thereof were respectively pipetted into a 150 ml-beaker and diluted with 80 ml distilled water.

Different ml-quantities of a FeCl$_3$-solution, which contains 48.41 g FeCl$_3$·6H$_2$O per liter in dissolved form, were added to each batch. Subsequently, the desired pH-value is adjusted with 0.1 n NaOH or 0.1 n HCl. The solution is transferred into a 250 ml round-bottom flask and refluxed for 1 hour.

After cooling to room temperature, the judgement is made.

To determine the iron-binding-capacity, the batch of the concentration series is used which does not yet show turbidity/precipitates, while the next following batch exhibits turbidity/precipitation.

The calculation is made in mg Fe$^{3+}$/1 g product-solids

| pH | iron binding capacity mg Fe$^{3+}$/g polymer solids |
|---|---|
| 7 | 600 |
| 9 | 800 |
| 11 | 350 |

EXAMPLE 32

Bleaching of 100% cotton linter having a degree of whiteness of 29.5 (according to Elrepho) was conducted in a bath having a liquor ratio of 1:20 each comprising the following treatment steps:

Step 1
Treatment with a liquor of
1 ml/l HCl, conc. (37%)
2ml/l of a combination comprising:
  42.0 parts of the polymer according to the present invention of Example 25 in acid final adjustment
  10.0 parts lactic acid
  25.0 parts of gluconic acid
  4.0 parts of phosphonic acid
  14.0 parts of a C12–C18 fatty alcohol polyglycol sulfate and
  5 parts of a foam-suppressing EO-PO-block polymer
for 30 minutes at 25° C.
Step 2
A) Treatment with a liquor of
  10 ml/l NaOH, 50%
  2 g/l Lavoral S313 (commercial product of Chemische Fabrik Stockhausen GmbH)
for 45 minutes at 95° C.
B) Treatment with a liquor of
  10 ml/l NaOH, 50%
  2 g/l of the combination acc. to step 1
for 45 minutes at 95° C.
C) Treatment with a liquor of
  10 ml/l NaOH, 50%
  2 g/l of the polymer acc. to the invention of Example 25
for 45 minutes at 95° C.
Step 3
Treatment with a liquor of
  3 ml/l of the combinationa acc. to step 1
  8 ml/l hydrogen peroxide, 35%
for 45 minutes at 95° C.

The hydrogen peroxide has previously been diluted in a solution of the combination acc. to step 1 and a quantity of water and added slowly in hot condition.

The liquor is drained off and the material is hot-rinsed at 80° C. under the addition of 2 ml/l polymer according to Example 25.

Three samples of the bleached material have a degree of whiteness of 68.7/69.8/69.7.

EXAMPLE 33

Manufacture of Leather

The suitability of the polymers according to the present invention in the manufacture of leather is shown in the following with reference to the chrome tanning of split leather and the retanning of upper leather. In chrome tanning, the leather is treated in chromium salt solutions in order to include chromium into the collagen structure of the leather. As much chromium as possible is to be transferred from the aqueous liquor into the leather. A polymer of Example 7 according to the present invention was used for this application, and it revealed a good result—the chromium content of the leather could be increased to a considerable extent.

TABLE 7

| Chromium content of the residual moisture | | Chromium oxide content of the leather | |
|---|---|---|---|
| before | after | before | after |
| use of polymer (g/l) | | use of polymer (%) | |
| 3.51 | 0.56 | 2.3 | 3.3 |

In the retanning of upper leather the following assessment criteria are to be used: softness, grain tightness, leather color, and fullness. Compared with a commercial retanning agent based on acrylamide/acrylic acid the above-mentioned polymer according to Example 7 was tested with the following result:

TABLE 8

| | Polymer according to Example 7 | Commercial Polymer |
|---|---|---|
| Softness | 2 | 3 |
| Grain tightness | 3 | 2 |
| Leather color | very bright | bright |
| Fullness (mm) | 1.8–1.9 | 1.9–2.0 |

*Order of assessment: 1–6, with 1 being best.

We claim:

1. A detergent or cleaning composition comprising at least one surface-active agent and a graft copolymer obtained by radical graft copolymerization of from 40 to 95 parts by weight of a monomer mixture in the presence of from 5 to 60 parts by weight of a saccharide component selected from the group consisting of monosaccharides, disaccharides, oligosaccharides, saccharide derivatives, and mixtures thereof; said saccharide derivatives being selected from the group consisting of sorbitol, mannitol, gluconic acid, glucuronic acid, alkyl glycosides, and alkyl-, hydroxyalkyl- and carboxyalkyl- ethers of saccharides; said monomer mixture comprising the following components:

- A) 36.95 to 96%-wt. of at least one monoethylenically unsaturated C3–C10 monocarboxylic acid, or salt thereof with a monovalent cation;
- B) 4 to 55%-wt. of at least one monoethylenically unsaturated monomer comprising a monosulfonic acid group, monoethylenically unsaturated sulfuric acid ester, vinylphosphonic acid or a salt thereof with a monovalent cation;
- C) 0 to 30%-wt. of at least one water-soluble, monoethylenically unsaturated polyalkyleneglycol ether of (meth)allyl alcohol or polyalkyleneglycol ester of (meth)acrylic acid, containing 2 to 50 moles of alkylene oxide units per mole of (meth) allyl alcohol or (meth) acrylic acid;
- D) 0 to 45%-wt. of at least one further, water-soluble, radically polymerizable monomer or a monomer which comprises at least two ethylenically unsaturated double-bonds, or an ethylenically unsaturated double-bond and a cross-linkable functional group other than an ethylenically unsaturated double-bond, and
- E) 0 to 30%-wt. other radically polymerizable monomers which are slightly soluble or insoluble in water selected from the group consisting of $C_1$ to $C_{18}$ alkyl(meth) acrylic acid esters, hydroxyalkyl(meth)acrylic, acid esters, mono- and dialkyl esters of maleic acid, N-alkyl and N,N-dialkyl (meth) acrylamides and vinyl carboxylic acid esters, the sum of components A to E being 100%-wt.

2. A composition according to claim 1, in the form of an aqueous washing solution comprising said at least one surface-active agent, said graft copolymer and water.

* * * * *